Oct. 28, 1947.    P. E. SIPPEL    2,429,701
MIXING MACHINE
Filed July 5, 1945    2 Sheets-Sheet 1

Inventor
Paul E. Sippel
By A. F. Flournoy
Attorney

Oct. 28, 1947.  P. E. SIPPEL  2,429,701
MIXING MACHINE
Filed July 5, 1945  2 Sheets-Sheet 2

Inventor
Paul E. Sippel
By
A. F. Flournoy
Attorney

Patented Oct. 28, 1947

2,429,701

UNITED STATES PATENT OFFICE 2,429,701

MIXING MACHINE

Paul E. Sippel, Shreveport, La.

Application July 5, 1945, Serial No. 603,297

5 Claims. (Cl. 259—151)

My invention relates to mixing machines, but more especially to asphalt mixing machines used in the making of asphalt compositions such as joint fillers used in expansion joints of concrete roads.

My invention is an improvement over prior art machines such as shown in the patent issued to B. E. Earle, #1,649,816, issued November 22, 1927.

While my improved mixing machine produces a product similar to products that are produced by prior mixing machines, it produces superior and more uniform products. I attribute the improvements in the products to both my improvements in my mixing machine and to improvements in the method of mixing the ingredients going into the make-up of the products. These improvements and advantages will become apparent as the description of my invention proceeds.

In the explanation of the operation of my mixing machine to follow, I will explain its operation when used in mixing asphalt and dry powdered clay. It is to be understood, however, that my machine may be used to mix other viscous liquids with finely divided clay or with finely divided materials other than clay.

One object of my invention is to provide a mixing machine with a mixing vat in which there is arranged a system of heating coils so positioned that the coils while performing their function of heating a mix contained in the mixing vat perform also the function of baffles to assist in the mixing of the heated mass in the mixing vat.

Another object of my invention is to provide an improved dust distributor nozzle for use in mixing machines that is designed so as to direct two streams of finely divided material onto heated turning masses of mixture in the vat in a manner to produce a more uniform and thorough mixture.

Another object of my invention is to provide a mixing machine that makes use of a mixing vat and steam and air jets at the bottom of the vat so positioned that steam and air coming out of the jets and being injected into the mixture cause a whirling or rolling motion in the mass tending to bring about a more complete and thorough mixing of the ingredients.

Another object of my invention is to provide a mixing machine that makes use of a mixing vat and steam and air jets near the bottom of the vat so positioned with respect to the bottom of the vat that individual jets of steam and air all strike the bottom of the vat to create a controlled flow of steam and air that sweeps the bottom of the vat clean of sediment.

Another object of my invention is to provide in a mixing machine that makes use of a heating vat and a steam jacket so positioned under the bottom of the vat that the bottom of the vat may be kept hot and thus prevent the mix in the vat from cooling and sticking to the bottom of the vat.

Other objects and advantages of my invention will appear in the course of my detailed description to follow of the mixing machine embodying my invention illustrated in the accompanying drawings.

Figure 1:
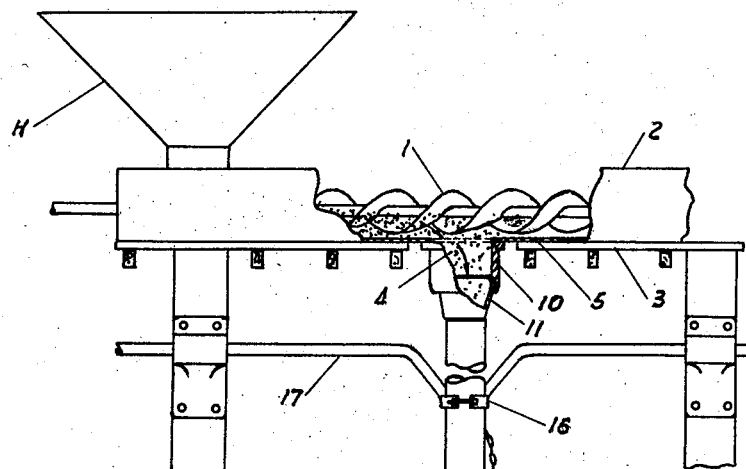
Figure 1 is an end view of a mixing machine embodying my invention.

Referring to the drawings, numeral 1 designates a screw type of conveyor for transporting the filler (clay dust or the like) from a hopper H. The conveyor 1 is mounted in a housing 2 supported on a raised platform 3 having a discharge opening 4 therein as shown by dotted lines in Figure 1. The discharge opening 4 is provided with a slide valve plate 5 operated manually by a rod 6 and lever 7 suspended from a suitable base as at 8.

Below the discharge opening 4 and suspended from the platform 2, as by a bracket 9, is a hopper 10 leading to a bell-shaped or semi-spherical hollow member 11. The hollow member 11 is provided with a pin 12 that extends through an opening 13 for pivotal engagement with the head 14 of a vertically arranged discharge pipe 15.

By the aforementioned means, the discharge pipe 15 is pivotally mounted on the hollow member 11 which in turn is suspended from the platform 3 beneath the discharge opening 14. Adjustably carried on the discharge pipe 15 is a strap 16 to which is pivoted a pitman 17 connected with a crank shaft 18 journalled in bearing element 19 on support 20. The crank shaft 18 is power driven by means not shown to swing the discharge pipe 15 back and forth, the strokes being regulated as to length by the position of the straps 16 thereon.

Upon the lower end of the discharge pipe 15 is slidably mounted a distributing nozzle 21 which may be adjusted to a proper discharging position on the discharge pipe 15 by a chain 22. Below the discharge pipe 15 is located a mixing vat 23, and around the mixing vat 23 a platform 30 is constructed. The mixing vat 23 is supported on a suitable base 24 preferably made out of brick or like construction.

The discharge pipe 15 as explained above is adapted to swing over the surface of asphalt or other material in the mixing vat 23 to discharge a filler material, clay dust or the like, from the conveyor 1. The strokes of the discharge pipe 15 are regulated to cover as much of the surface of the liquid material in the mixing vat 23 as possible, which in some cases is the whole exposed surface of the material. During this operation the distributing nozzle 21 is adjusted to be properly spaced above the surface of the material in the mixing vat 23.

Asphalt is loaded into the mixing vat 23 through a service pipe 25. The completed mix of asphalt and filler is expanded with air and steam or other gases before being discharged or unloaded through the mixture discharge pipe 26.

In order to properly mix the filler with the asphalt or the like it is desirable that the asphalt or the like be maintained at boiling or high temperature and to this end I provide a plurality of vertically spaced longitudinally arranged steam pipe coil banks 27, each of which is under the control of a control valve 28. The heating steam is maintained at a pressure and temperature sufficiently high to prevent it from condensing in the coil banks 27. The used steam is discharged through the discharge lines 29.

Figure 2:
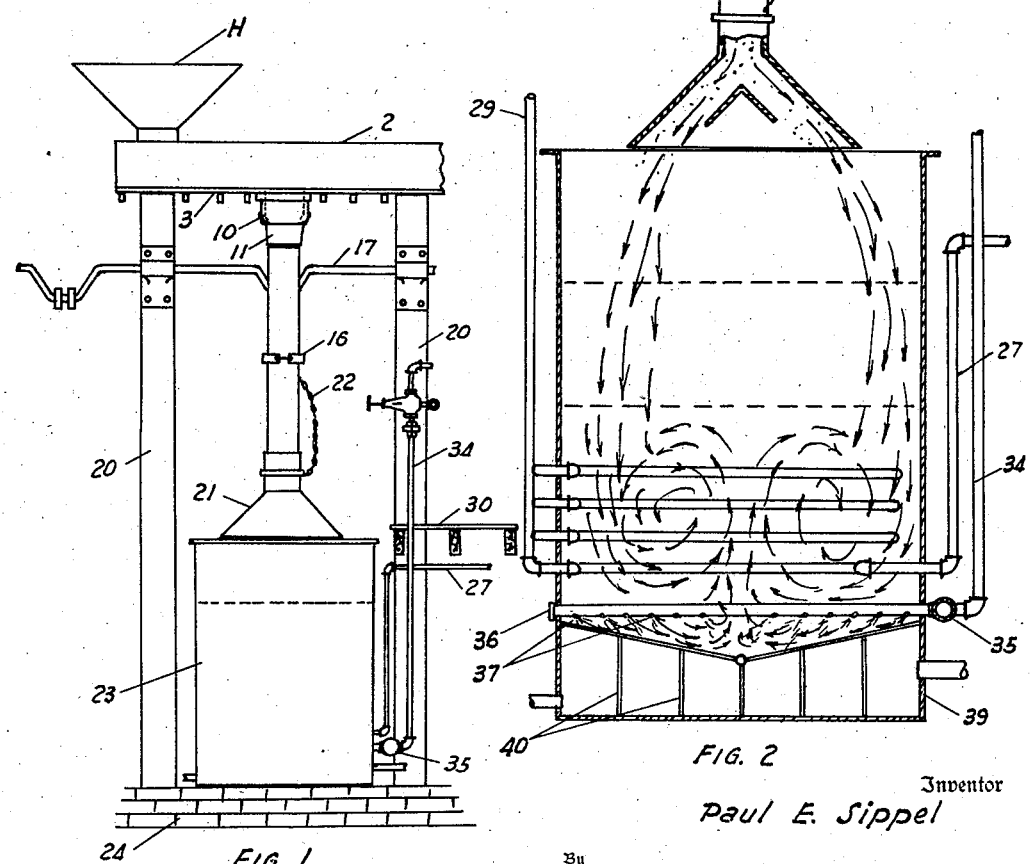
Figure 2 is an enlarged broken end view of the mixing machine illustrated in Figure 1.
Figure 3:
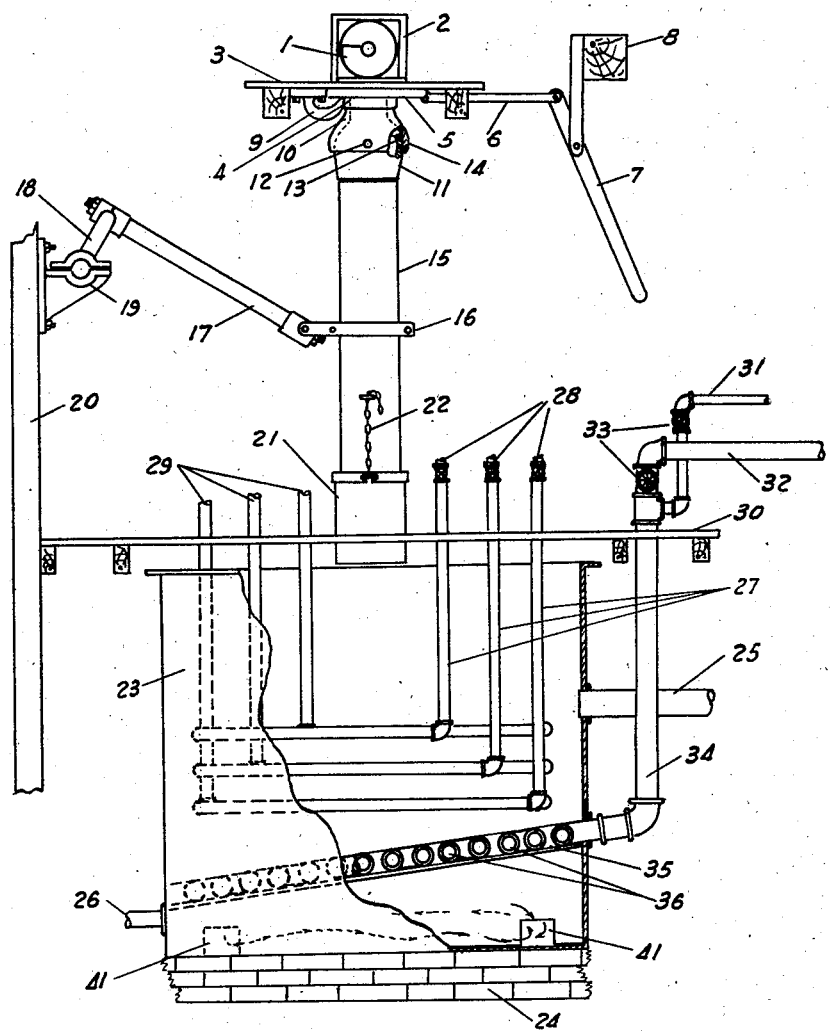
Figure 3 is a broken side view of the mixing machine illustrated in Figure 1.

In order to agitate a body of asphalt or other material in the mixing vat 23 to properly mix a filler into it, I employ both compressed air and live steam, the same being delivered through a service pipe 34 into an agitator header 35 from which jet tubes 36 are extended through a watertight connection through the side walls of the mixing vat 23 in a layer that bridges the V-shaped bottom of the mixing vat 23, as best seen in Figure 2 of the drawing. This layer of spaced jet tubes 36 is placed beneath the bottom runs of the coil bank 27.

The service pipe 34 leading to the header 35 is connected with both a steam pipe 31 and an air pipe 32. By operation of the valves 33 air or steam or both air and steam may be delivered to the service pipe 34 and thence to the header 35 and then to the jet pipes 36.

The jet pipes 36 are provided with a plurality of bores 37 placed in slanting positions into the jet pipes 36 and aligned in slanting positions to the two sloping surfaces of the V-shaped bottom (see Figure 2) of the mixing vat 23 in order that the jets of steam, air, or steam and air coming out of the bores 37 will impinge in overlapping patterns on the bottom of the mixing vat 23.

The bores 37 are terminated in flared mouth openings 38 on the outer surface of the jet pipes 36 to make the jet discharge spread into overlapping patterns of steam, air or steam and air over the bottom of the mixing vat 23.

When the mixing vat 23 has been filled to the desired level, say to the dot and dash lines in Figures 1 and 2, steam is directed into the coil banks 27 by opening the steam valves 28. Asphalt or other substance is raised to a boiling temperature or to a very high temperature above the boiling temperature by the steam passing through the coil banks 27, and is kept at this temperature until the mixing operation is completed. Filler material (clay dust or the like) is delivered to the distributing pipe 15 from the conveyor 1, the valve plate 5 being open.

The shaft 19 is actuated to swing the discharge pipe 15 back and forth over the surface of the asphalt or other material in the mixing vat 23 to uniformly spread or distribute the same. The level of the asphalt or other liquid material rises with the temperature and with the incorporation of filler material therein. The distributing nozzle 21 should be adjusted by the chain 22 to maintain a uniform spaced relationship between the discharge nozzle 21 and the level of the asphalt or other material. As the filler is fed into the mixing vat 23, the asphalt or other material is agitated by causing steam or air to flow through the slanting bores 37 of the jet pipes 36.

Difficulties were encountered in the use of simple, ordinary pneumatic agitating apparatus because it was found that its air outlet holes clogged up and became inoperative when asphalt congealed in some of its vent openings. By the use of live steam or air and steam, the openings in the bores 37 of my jet pipes 36 are kept open and clear by reason of the heating action of the steam. In the construction of my jet pipes 36 the total cross sectional area of the bores 37 is made less than the total inside cross sectional area of the jet pipes 36, thereby maintaining a discharge pressure at each bore 37. In this way I make steam, air, or steam and air flow through each bore 37 under pressure which prevents any back flow of asphalt or the like into any of the bores 37.

Figure 4:
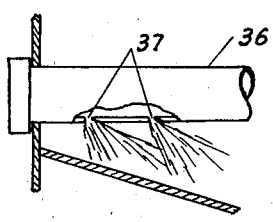
Figure 4 is an enlarged fragmentary view of a portion of the mixing machine.
Figure 5:
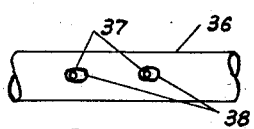
Figure 5 is an enlarged fragmentary view of a portion of the structure illustrated in Figure 4.

With my novel arrangement of forming the bores 37 in the slanting position with respect to the sloping bottom surfaces of the mixing vat 23, I am enabled to sweep the bottom of the mixing vat 23 clean of all sediment thereby avoiding the necessity of frequent removal of the coils in order to clean the vat. Figure 4 of my drawings will show the patterns of the sprays coming out of the bores 37 overlap. The reader will also see that the sprays do not buck one another, but rather, their forces are added together on each side of the center line of the bottom of the mixing vat 23 to create two opposing streams of sweeping steam, air, or steam and air. I make the bottom of my mixing vat 23 V-shaped to confine the flow of the material over the bottom surfaces of the mixing vat 23 compelling at the same time, easier and more complete discharge of the finished material. The right and left streams of the air and steam produce movements of the mix toward the longitudinal center line of the mixing vat 23.

When the right and left sweeping streams come together, they buck each other and go upward in parallel streams or perhaps in a single stream. The upward movement of the sweeping stream assists in forming the mix into two rolling cylindrical masses. This rotary motion of the two rolling cylindrical masses is of great advantage in a mixing device of the kind my improvement relates to. The increased motion of the mass brought about by my arrangement of the jet pipes 36 lessens the time required to mix the asphalt or other material with the finely divided clay or the like and also produces a more uniform mix.

The finely divided clay or the like coming from the distributing head 21 falls into two streams one on each of the rotary masses of material in the mixing vat 23. The dust is lapped into the rolling masses of material in uniform layers. The reader should bear in mind at this part of my description that the distributing head 21 is being moved back and forth lengthwise of the mixing vat 23, which is to say in a direction parallel to the axis of rotation of the two rotating masses of material.

In addition to making the bottom of my vat 23 V-shaped, I have found it a great advantage to slope the V-shaped bottom downward toward the discharge opening of the mixing vat 23. With this arrangement I find that no sediment ever accumulates in even this gutter portion of the bottom of the mixing vat 23.

I have placed a heating jacket 39 underneath the bottom of the mixing vat 23 to keep the mix hot and prevent it from sticking to the bottom of the mixing vat 23 and to the facilitate the flow of the material out of the discharge opening 26 of the mixing vat 23 and to facilitate the flow partitioned off into longitudinal passageways by means of partition walls 40 welded to the bottom of the mixing vat 23 and the bottom wall of the heating jacket 39. Steam introduced into the heating jacket 39 travels in a circuitous direction, up one passageway and down the next. The steam goes through the partition members 40 through notches 41 formed in the bottom edge of each partition wall 40. Each partition wall 40 has only a single notch 41 in it, and the notches 41 are placed in alternate ends of the partition walls 40.

In order that the reader may more clearly understand the novelty presented by my invention as it relates to improvements in methods of mixing a powdered material with a viscous material, he should visualize the powdered material as being lapped into the viscous material in layers as in a jelly roll, the cake corresponding to the viscous mass and the layer of jelly corresponding to the layer of powdered material. Of course, the rolls in the mixing vat 23 are being broken up by the runs of the coil banks 27 both during the movement of the mass downwardly and as it ascends. Of course, the reader must understand that the core portions of the rolling masses are being constantly drawn into the revolving areas of the masses and being replaced by new material moving into its place. The steam, air, or steam and air coming out of the bores 37 of the jet pipes 36 become mixed into the material in the mixing vat 23 as it is blasted through the layers of moving material travelling along the bottom of the mixing vat 23 and underneath the lower runs of the coil banks 27.

Having thus described my invention, I claim:

1. A mixing machine comprising a mixing vat adapted to hold a liquid, said mixing vat being provided with a slanting bottom portion, a gas discharging device including a plurality of gas discharge pipes each extending over said slanting bottom portion, each of said gas discharge pipes being provided with a plurality of gas discharge vents positioned parallel to one another in acute angular directions both with respect to said slanting bottom portion and to the longitudinal center lines of said discharge pipes whereby jets of gas expelled through said vents will sweep said slanting bottom portion and combine to revolve a liquid in said vat, and a means for discharging a material onto the surface of a liquid in said vat.

2. A mixing machine comprising a mixing vat adapted to hold a liquid, said mixing vat being provided with a downwardly extending bottom surface, said downwardly extended bottom surface comprising a pair of diverging sloping surfaces, a gas discharge device including a gas discharge pipe extending over each of said sloping surfaces and adjacent to said sloping surfaces, each of said discharge pipes being provided with a plurality of gas discharge vents positioned in acute angular directions downwardly to said sloping surfaces whereby jets of gas expelled through said gas discharge pipes will sweep said sloping surfaces and stir up a portion of a liquid in said mixing vat into a pair of revolving masses.

3. A mixing machine comprising a mixing vat adapted to hold a liquid, said mixing vat being provided with a downwardly extended bottom surface, said downwarly extended bottom surface comprising a pair of diverging, intersecting, sloping surfaces defining a channel, a gas discharge device including a plurality of parallel spaced discharge pipes positioned adjacent to said sloping surfaces in a manner to bridge said channel defined by said sloping surfaces, each of said discharge pipes being provided with a plurality of gas discharge vents positioned in acute angular directions downwardly to said sloping surfaces whereby jets of gas expelled through said gas discharge pipes will sweep said sloping surfaces and stir up a portion of liquid in said mixing vat into a pair of revolving masses.

4. A mixing machine comprising a mixing vat adapted to hold a liquid, said mixing vat being provided with a downwardly extended bottom surface, said downwardly extended bottom surface comprising a pair of diverging, intersecting, sloping surfaces defining a channel, a gas discharging device including a plurality of parallel spaced discharge pipes positioned adjacent to said sloping surfaces in a manner to bridge said channel defined by said sloping surfaces, each of said discharge pipes being provided with two sets of discharge vents, the vents of one of said sets being positioned in acute angular downwardly extending directions to one of said sloping surfaces, the vents of the other said set being positioned in acute angular directions downwardly extending to the other said sloping surface whereby jets of gas expelled through said vents of the respective sets of vents will combine into sweeping streams of gas on said sloping surfaces and combine into a common ascending stream at the center line of said channel defined by said sloping surfaces to stir a volume of liquid over said sloping surfaces into a pair of oppositely rotating revolving masses of liquid and a material discharging device provided with a double mouthed spout adapted to discharge a stream of material onto the surface of one of each of said revolving masses of liquid.

5. The device as claimed in claim 4 wherein said sloping surfaces are positioned to define a downwardly sloping channel and wherein said mixing vat is provided with a liquid discharge opening at the lower end of said channel.

PAUL E. SIPPEL.

REFERENCES CITED

The following references are of record in the file of this patent:

UNITED STATES PATENTS

| Number | Name | Date |
| --- | --- | --- |
| 1,127,660 | McMichael | Feb. 9, 1915 |
| 1,157,092 | Du Rell | Oct. 19, 1915 |
| 1,649,816 | Earle | Nov. 22, 1927 |
| 2,292,897 | Nielson | Aug. 11, 1942 |

FOREIGN PATENTS

| Number | Country | Date |
| --- | --- | --- |
| 602,996 | Germany | Sept. 20, 1934 |